(12) United States Patent
Mak

(10) Patent No.: US 7,496,430 B2
(45) Date of Patent: Feb. 24, 2009

(54) INTELLIGENT FAULT DETECTOR SYSTEM AND METHOD

(75) Inventor: Sioe T. Mak, Chesterfield, MO (US)

(73) Assignee: Distribution Control Systems, St. Louis, MO (US)

( * ) Notice: Subject to any disclaimer, the term of this patent is extended or adjusted under 35 U.S.C. 154(b) by 0 days.

(21) Appl. No.: 11/682,747

(22) Filed: Mar. 6, 2007

(65) Prior Publication Data

US 2007/0211401 A1 Sep. 13, 2007

Related U.S. Application Data

(60) Provisional application No. 60/780,152, filed on Mar. 8, 2006.

(51) Int. Cl.
G05D 17/00 (2006.01)
(52) U.S. Cl. ............. 700/292; 340/870.02; 340/870.03; 700/286; 700/295; 702/62
(58) Field of Classification Search ................. 700/286, 700/292, 295, 293, 294; 702/62, 107, 58, 702/59; 340/310.16, 3.51, 870.01, 870.02, 340/870.03
See application file for complete search history.

(56) References Cited

U.S. PATENT DOCUMENTS

| | | | | |
|---|---|---|---|---|
| 2,365,514 | A | * 12/1944 | Bosch | .......................... 361/63 |
| 3,259,802 | A | * 7/1966 | Steen | ........................... 361/48 |
| 4,297,738 | A | 10/1981 | Lee | |
| 4,313,146 | A | 1/1982 | Lee | |
| 5,245,498 | A | 9/1993 | Uchida et al. | |
| 5,295,035 | A | 3/1994 | Nishijima et al. | |
| 5,303,112 | A | 4/1994 | Zulaski et al. | |
| 5,475,556 | A | 12/1995 | Yoon et al. | |
| 5,485,093 | A | 1/1996 | Russell et al. | |
| 5,486,805 | A | * 1/1996 | Mak | ....................... 340/310.16 |
| 5,537,327 | A | 7/1996 | Snow et al. | |

(Continued)

OTHER PUBLICATIONS

Mak et al., "A TWACS system alarm function for distribution automation", IEEE Transactions on Power Delivery, vol. 9, No. 2, Apr. 1994.*

(Continued)

Primary Examiner—Paul L Rodriguez
Assistant Examiner—Carlos Ortiz Rodriguez
(74) Attorney, Agent, or Firm—Polster, Lieder, Woodruff & Lucchesi, LC

(57) ABSTRACT

A quick response system incorporated in a TWACS for mapping an outage in an electrical distribution system without having to continuously poll the electrical meters connected to the system. In a primary embodiment of the invention when a fault is sensed to have occurred, the amplitude of the fault is measured to determine if the fault is a medium voltage fault, or a low voltage fault. The pattern of the fault signature and change in load, both before and after the fault, are examined to determine what protective device was triggered by the fault. Using this information, and knowledge of the number and location of electrical meters connected in the distribution system, a population of meters to be polled is determined. By polling the identified population, a map of the extent of the outage is readily determined, and the time to respond to the fault and restore service is reduced.

12 Claims, 7 Drawing Sheets

U.S. PATENT DOCUMENTS

| | | | |
|---|---|---|---|
| 5,550,751 A | 8/1996 | Russell | |
| 5,608,328 A | 3/1997 | Sanderson | |
| 5,696,695 A * | 12/1997 | Ehlers et al. | 700/286 |
| 5,734,575 A | 3/1998 | Snow et al. | |
| 6,246,556 B1 | 6/2001 | Haun et al. | |
| 6,459,998 B1 * | 10/2002 | Hoffman | 702/62 |
| 6,473,281 B1 * | 10/2002 | Kornblit | 361/42 |
| 6,496,342 B1 | 12/2002 | Horvath et al. | |
| 6,714,395 B2 | 3/2004 | Meisinger, Sr. et al. | |
| 6,798,211 B1 | 9/2004 | Rockwell et al. | |
| 6,988,042 B2 | 1/2006 | Choi et al. | |
| 7,069,116 B2 | 6/2006 | Kunsman et al. | |
| 7,130,722 B2 * | 10/2006 | Soni | 700/286 |
| 7,145,757 B2 | 12/2006 | Shea et al. | |
| 7,180,300 B2 | 2/2007 | Premerlani et al. | |
| 2002/0015271 A1 | 2/2002 | Meisinger, Sr., et al. | |
| 2003/0067725 A1 | 4/2003 | Horvath et al. | |
| 2006/0036388 A1 * | 2/2006 | Swarztrauber | 702/107 |
| 2006/0176631 A1 | 8/2006 | Cannon | |
| 2006/0184288 A1 * | 8/2006 | Rodgers | 700/295 |

OTHER PUBLICATIONS

Mak et al., "Design Considerations for Implementing of Large Scale Automatic Meter Reading Systems", IEEE Transactions on Power Delivery, vol. 10, No. 1, Jan. 1995.*

* cited by examiner

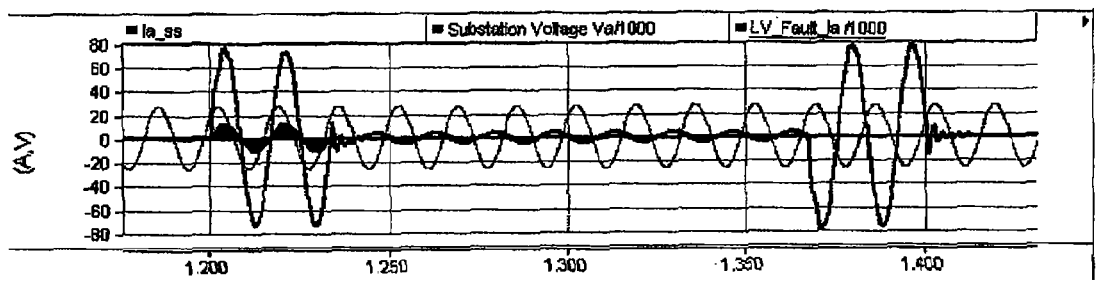
(a) Phase A to ground fault under Light load conditions (3.7MW, 0.19 MVAR)
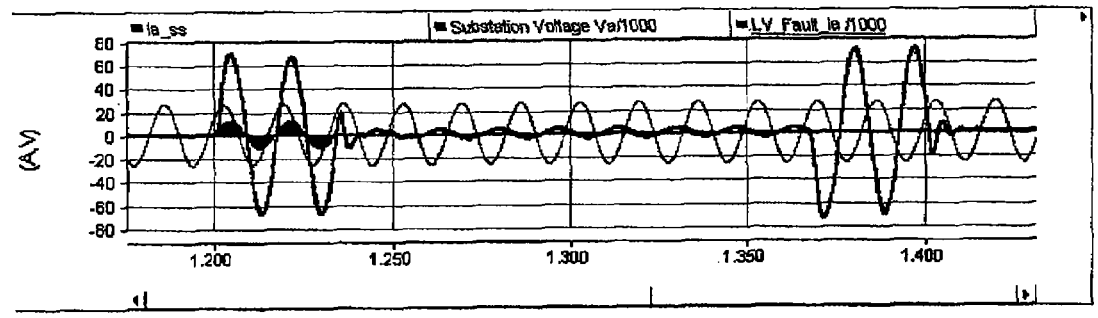
(b) Phase A to ground fault under Heavy load conditions (14.9 MW, 2.37 MVAR)
Figure 3.Phase A to Ground fault on the LV side of the service transformer

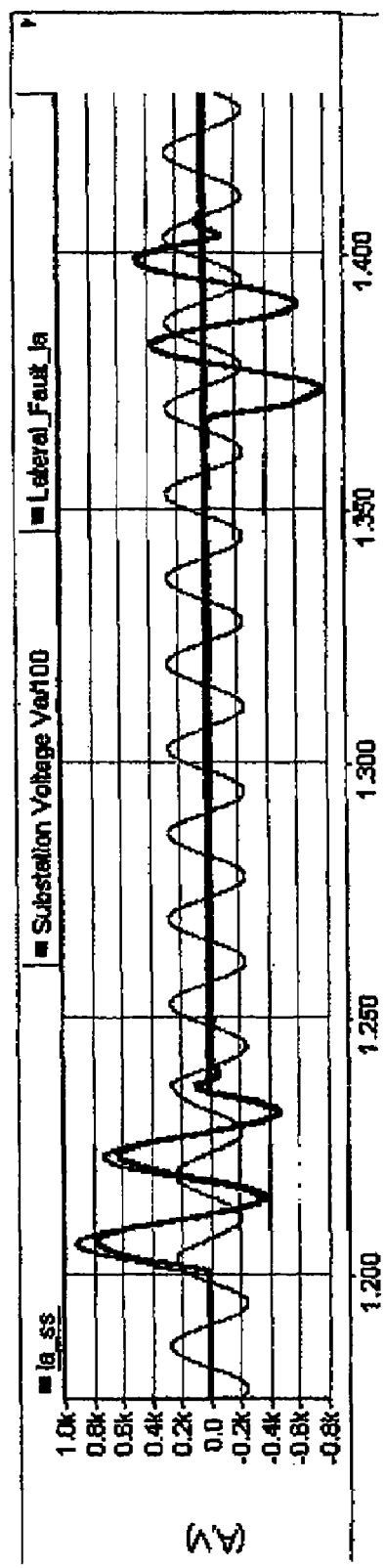
Figure 4. Phase to Ground fault on the end point of a lateral on the MV side

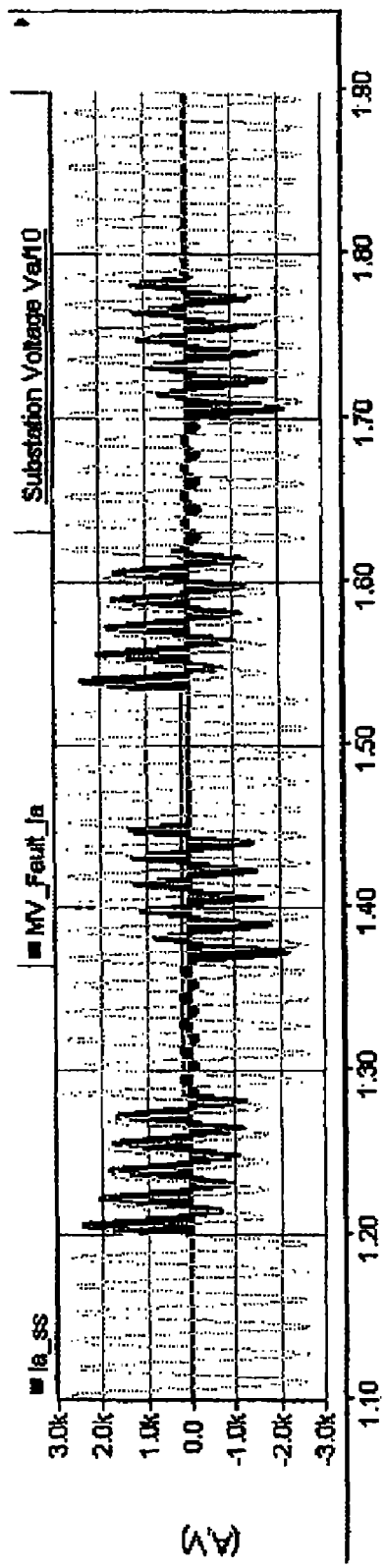
Figure 5. Short circuit current from a feeder fault past the recloser

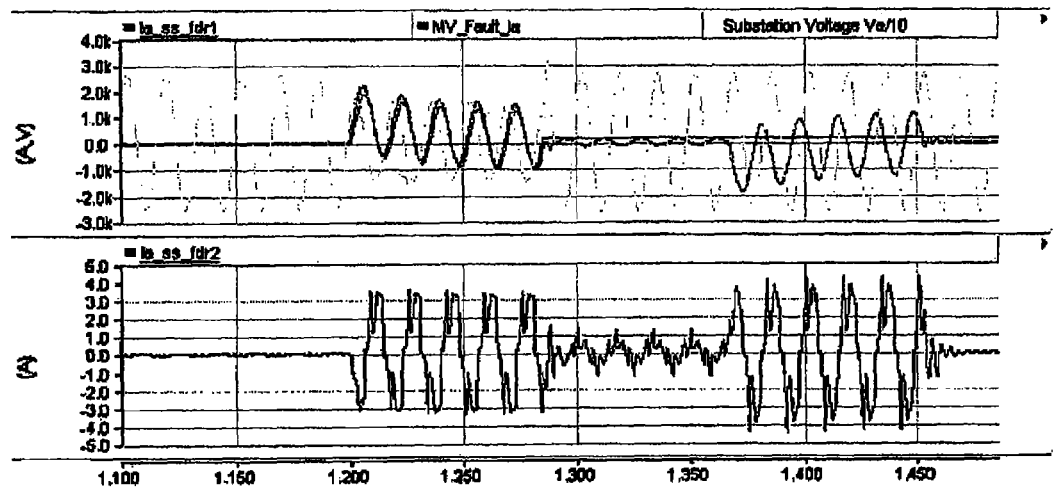
(a) Current on feeders 1 and 2 for a PF=0.65 on feeder2
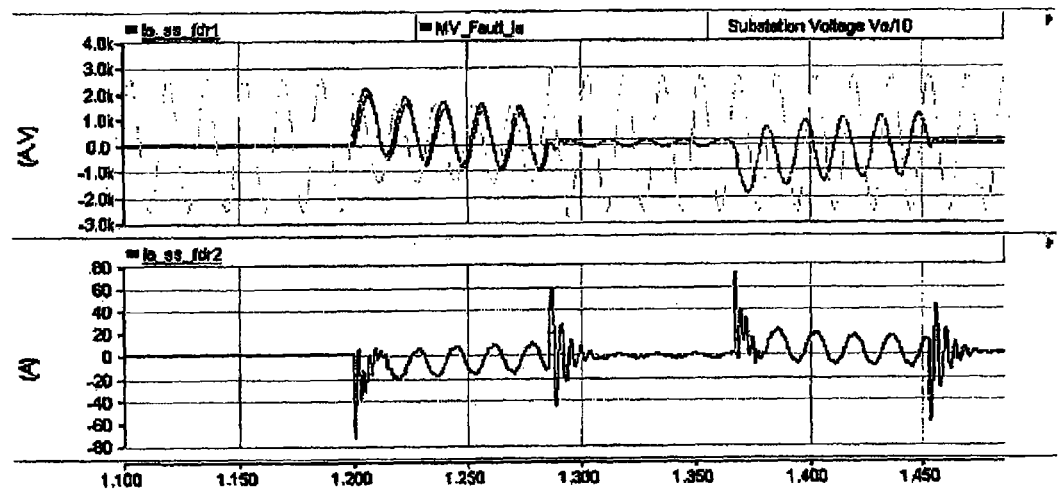
(b) Current on feeders 1 and 2 for a PF=0.99 on feeder2
Figure 7. Sympathetic feeder current

INTELLIGENT FAULT DETECTOR SYSTEM AND METHOD

CROSS-REFERENCE TO RELATED APPLICATIONS

This application claims priority to U.S. patent application No. 60/780,152 filed Mar. 8, 2006 and is incorporated hereby by reference.

STATEMENT REGARDING FEDERALLY SPONSORED RESEARCH

Not Applicable.

BACKGROUND OF THE INVENTION

This invention relates to the detection and characterization of a fault occurring in an electrical or power distribution system; and, more particularly, to a system and method incorporated in a two-way automated communications system or TWACS® to identify affected power lines including a particular bus, feeder, phase, etc., to selectively poll transponders installed with electrical meters at facilities to which the power is supplied to quickly identify and map the extent of an outage occurring anywhere within the system.

TWACS technology, various aspects of which are described, for example, in U.S. Pat. Nos. 6,940,396, 5,933,072, 5,486,805, 5,262,755, 4,963,853, 4,918,422, and 4,914,418, has been found to have certain inherent advantages in determining the location of power outages which occur in an electrical distribution system. This is done by sending a communication signal from a master station within the system to poll all of the electrical meters installed in that portion of the system from and to which communications with the meters are sent. A drawback with the current protocol for detecting the outages is that the polling needs to be done continuously; or, the polling needs to be triggered in response to an event (outage) so that the scope of the event can be determined, and subsequently the extent of restoration of the power distribution disrupted by the event.

Since polling during restoration is usually under the control of personnel responsible for the restoration, triggering a poll is not a problem. However, determining when to poll in response to a new outage is often problematical. If polling is done too soon, the extent of the problem may not be readily determined. Too late, and response to the problem may be delayed, prolonging the time when customers are without service. It would be helpful therefore to incorporate within a TWACS a means by which polling to determine the extent of an outage is reliably triggered after a fault occurs.

BRIEF SUMMARY OF THE INVENTION

The present invention is directed to a method and system for providing a capability, self-contained within a TWACS, to trigger the polling of electrical meters connected in an electrical distribution system in response to a power outage resulting from the occurrence of a fault.

The invention requires that when a fault is sensed to have occurred, that the amplitude of the fault be measured so a determination can be made as to whether the fault was a medium voltage (MV) fault, or a low voltage (LV) fault. Next, the pattern of the fault signature is examined, together with the change in load, both before and after the fault, so to determine the type of protective device that triggered in reaction to the fault. Based upon the foregoing analysis, and a knowledge of the connectivity (number and location) of electrical meters within the distribution system, a population of meters to be polled is determined. By polling the identified population, a map of the extent of the outage is readily determined, and the time to respond to the fault and restore service is greatly reduced.

Further embodiments of the invention may not require reliance on the above information, but rather may rely on the knowledge that a fault has occurred, and on which electrical conductors within the distribution system. In this embodiment, even though there may be a larger population of meters to be polled, fast polling techniques incorporated within the TWACS enable polling of meters in blocks of 256, for example, and this allows the polling to be done relatively quickly so that response time to the fault is still greatly reduced.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

FIGS. 3a and 3b display a Phase ($\phi$) A to ground load condition signature on the LV (low voltage) side of a service transformer for both a light load (FIG. 3a) and a heavy load (FIG. 3b) condition;

FIG. 4 is a display similar to FIG. 3 but illustrating the phase to ground load condition signature on the MV side of the transformer;

FIG. 5 is a display of short circuit current from a feeder line fault past a recloser for the line with a 15 cycle closing time;

FIGS. 7a and 7b display sympathetic feeder currents for two different power factors on one of the feeders, P.F.=0.65 (FIG. 7a) and P.F.=0.99 (FIG. 7b).

Corresponding reference characters indicate corresponding parts throughout the several views of the drawings.

DESCRIPTION OF THE PREFERRED EMBODIMENT

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1:
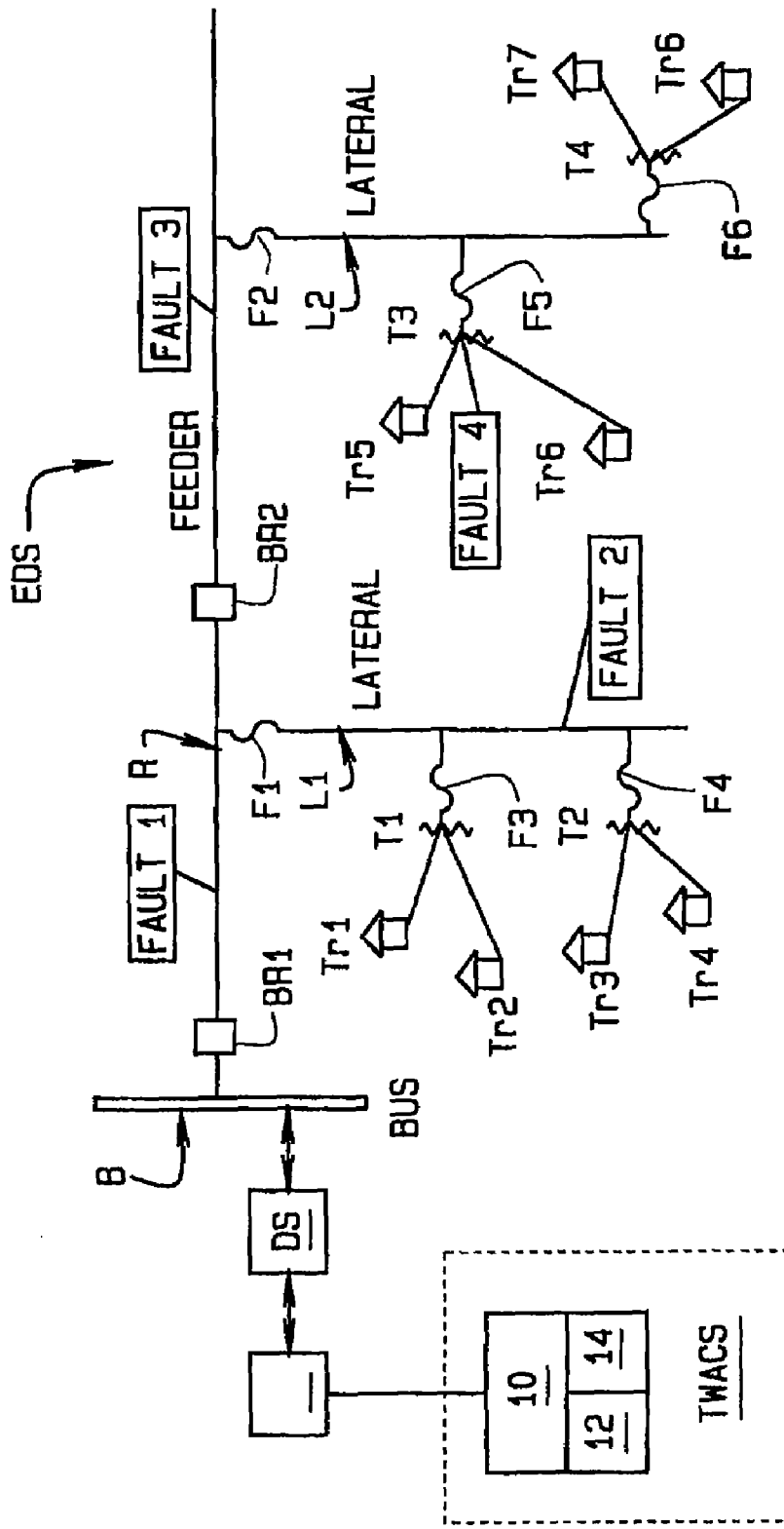
FIG. 1 is a simplified representation of an electrical distribution system illustrating the installation of circuit breakers, fuses, and other protective devices in the system which react to occurrence of a fault.

Referring to FIG. 1, a portion of an electrical distribution system or power distribution network EDS is illustrated. As shown in the Fig., electrical current flows through a bus B to a feeder R, and through the feeder to laterals L1, L2. A circuit breaker BR1, BR2, etc., is interposed in the feeder between the juncture of each lateral with the feeder. A fuse F1 or F2 is interposed in the laterals at the junction between the respective laterals and feeder R at the upstream end of the lateral. From the laterals, the current flows through step-down transformers T1-T4, each of which has an associated fuse F3-F6 respectively. From each transformer, the current is routed to individual using sites (houses, office buildings, factories, etc.) each of which has an electrical meter with an associated transponder Tr1-Tr8. The distribution system employs a TWACS by which the meters are polled from a master station MS and distribution substation DS to send commands to, and receive responses from, each meter via its associated transponder. In accordance with the present invention, and as described hereinafter, a quick response system is incorporated into the TWACS for mapping an outage in the electrical distribution system without having to continuously poll the electrical meters connected to the system.

In 50 or 60 Hz three phase (3φ) circuits, voltages are described in terms of phasors.

One set of phasors are line-to-neutral phasors designated $V_{AN}$, $V_{BN}$ and $V_{CN}$. Another set of phasors are line-to-line voltage phasors and are designated $V_{AB}$, $V_{BC}$, and $V_{CA}$. The line-to-line voltage phasors are related to the line-to-neutral phasors by the following equations:

$$V_{AB} = V_{AN} - V_{BN}$$

$$V_{BC} = V_{BN} - V_{CN}$$

$$V_{CA} = V_{CN} - V_{AN}$$

At each location along the length of bus B, feeder R, and laterals L1 and L2, the voltage phasors for any one phase are slightly different. That is, the phasor has a slight shift in phase due to the voltage drop in the circuit because of the load current. The winding configurations and primary-secondary winding ratios of different types of three-phase step-down transformers only affect the magnitude of the phasor, not its phase.

The power line communication technology employed in TWACS used by electrical utilities for automatic meter reading (AMR) modulates the bus voltage for outbound communications from master station MS to the remote meter reading transponders Tr1-Tr8 and the system operates in a phase sequential fashion. That is, if the line-to-neutral voltage $V_{AN}$ is modulated with an "outbound" signal, the corresponding voltage at the remote site, which has a corresponding phasor to the bus voltage phasor $V_{AN}$, also sees the modulation signal. The response from the transponder back to the master station, the "inbound" signal, is a precisely controlled, impedance limited current pulse generated by the meter reading transponder at the service voltage level. The pulse current is located near the zero crossing point of the service voltage that provides power to the transponder Tr, which transponder has a phasor corresponding to the bus voltage phasor. Accordingly, this pulse, after multiple transformer winding ratio magnitude changes, will also appear on the φA conductor near the modulated bus voltage zero crossing of phasor $V_{AN}$. The correspondence of these physical characteristic properties of the phasors in a TWACS simplifies operational design of the communication's system.

To help understand how a communication path parameter is used to correlate the address of a meter reading transponder to a voltage phasor, consider an example in which an outbound command issued at a distribution substation DS of the system on phase AN reaches all the transponders Tr whose phasors correspond to the modulated bus voltage phasor. An inbound response from an appropriate transponder would then be expected on the φA conductor at substation DS, with its signal location near the zero crossing of the bus voltage $V_{AN}$. This inbound signal is extracted from the bus for φA, or a φA current transformer (not shown) on a feeder. All the transponders which can be reached by sending an outbound command on phase $V_{AN}$, and their inbound response, can be captured from the current transformers for that phase; and the location in the current waveform at which the inbound signals are extracted, is in the vicinity of the phase voltage $V_{AN}$ zero-crossing points on the waveform. The phase voltage $V_{AN}$ and the φA current transformer are therefore path parameters for all those transponders.

The same is also true for the other phases and the line-to-line voltages. For modulation of phase AB, for example, the inbound signal appears on the φA and φB current transformers. The current magnitude of a typical inbound signal transmitted through a 13.8 kV system is approximately 1.5 amps (peak).

The phasor correspondence characteristics of steady state and transient currents in a 3-phase electrical distribution system EDS are such that a change in the magnitude of the current within the system, at some point in the circuit (and identifiable by its voltage phasor), is also sensed at the conductor for the phase at substation DS; and the current phase relationship, with respect to the bus phase voltage phasor, is the same at the location in the system where the change in current occurs. This identical phasor correspondence characteristic behavior with respect to a change in current magnitude change is the same as that previously discussed with respect to TWACS power line communication. As such, it provides unique advantages for the outage mapping function of the present invention. This is because if a segment of a system, at a certain phase, is disconnected, all meter reading transponders connected to that segment will be de-energized, and hence will not respond to a communication inquiry sent over the TWACS. Importantly, a device or method by which a fault can be sensed, and which can also identify the phase where the fault occurs, can provide information to the TWACS as to which meter reading transponders to poll in order to determine which part of the network is de-energized. Importantly, there is now no need to poll the transponders on all phases which constitutes a significant savings in time both in identifying the extent of an outage and restoring service.

In accordance with the invention, a device 10 is incorporated into the TWACS to effect selective coordination of protective devices used to quickly isolate faults. Device 10 does this, for example, by coordinating the operational speed of the various protective devices installed in the distribution system in such a way as to minimize loss of power to the network. The use of protective devices includes uses of a combination of circuit breakers, reclosers and fuses. To understand how a selective coordination of such devices is set up with device 10, refer again to FIG. 1.

As shown in the Fig., feeder R is protected by the two circuit breakers BR1 and BR2, and the laterals L coming off the feeder are protected by the fuses F1 and F2. As is known in the art, the fuses protect the circuit from faults occurring at the distribution transformers T1-T4, or at the low voltage side. If a fault occurs at the location indicated Fault 4 in FIG. 1, for example, this causes fuse F5 at distribution transformer T3 to open, and this isolates transformer T3 and whatever is connected downstream to it from the rest of the distribution system. Similarly, if the fault occurs at the location indicated Fault 2, this causes fuse F1 at the upstream or beginning end of lateral L1 to open. Now, the entire extent of lateral L1, including the meter reading transformers Tr1-Tr4, are de-energized. If a fault occurs at the location indicated Fault 3, this causes circuit breaker BR2 to open de-energizing everything downstream, but not upstream, of the circuit breaker to be de-energized. Accordingly, lateral L2 and everything feeding off lateral L2 is de-energized, but circuit breaker BR1 remains closed, and lateral L1, and everything feeding off lateral L1, remain energized. Finally, a fault at the location designated Fault 1 causes circuit breaker BR1 to open and the whole of feeder R and everything connected to it are de-energized.

Fuses and circuit breakers have different operational characteristics. Circuit breakers, for example, have a programmable time delay of operation. Accordingly, several cycles of fault current may occur before the circuit breaker opens. Fuses, on the other hand, operate within a cycle or less. Hence, a fault occurring beyond the location of a fuse results in the fuse operating first. Meanwhile, the time delay restraint programmed into the breaker lets the breaker waits until the fuse clears the fault; and if the fault is promptly cleared, the breaker can decide not to operate.

Device 10, which detects fault current, is a programmable device which can readily discriminate between the operation of a fuse or a circuit breaker. Quite often large load switching produces a load inrush current which has a magnitude on the order of a fault current present beyond the location of a distribution transformer T1-T4. Device 10 is programmed to discriminate between a fault current and this load inrush current, and the ability to distinguish between the two significantly reduces the number of transponders Tr having to be polled.

Consider the following five examples of how device 10 operates to reduce the amount of polling required in the event a fault occurs and there is an outage:

| Device 10 alert | Transponders Tr to poll |
|---|---|
| 1. Circuit breaker BR1 is open. | Poll only one or two transponders (e.g., Tr1 and Tr5) to verify that all of feeder R is de-energized. |
| 2. Circuit breaker BR2 is open. | Poll one transponder before breaker BR2 and one transponder beyond the breaker. For example, poll transponders Tr1 and Tr5. Here, transponder Tr1 will respond to the poll, but not transponder Tr5. |
| 3. Fuse F1 or F2 is open. | Poll at least one transponder per lateral, for example, transponder Tr1 and transponder Tr5. If transponder Tr1 does not respond (fuse F1 open) but transponder Tr5 does (fuse F2 closed), then lateral L1 is de-energized, but lateral L2 is energized. Conversely, if transponder Tr1 responds (fuse F1 closed), but transponder Tr5 does not (fuse F2 open), then lateral L1 is energized, but lateral L2 is de-energized. |
| 4. Fuse F3, F4, F5, or F6 is open. | Poll one transponder T1-T4 from each distribution transformer. The transponder which does not respond indicates the fuse for the transformer serving that transponder is open. |
| 5. Detect load increase or decrease. | Do not poll. |

Device 10 is programmed with an algorithm used to extract fault current from a phase conductor. This algorithm is a modified subset of the algorithm used for inbound signal detection in TWACS. The basic module of the inbound detector can be mathematically stated as, $$\delta(t) = i(t) - i(t-T) \quad (1)$$

where i (t) is the magnitude of the current at time t,
i (t–T) is the magnitude of the current at time (t–T),
T is the period of the system's frequency, and
δ(t) is the residual or residue.

Implementation of this algorithm into the digital domain is done using an analog-to-digital converter 12 in device 10 which runs at a predetermined sampling rate, and a memory 14 within the device for storing data. In the digital domain, the equation for the residue becomes, $$\delta(j) = i(j) - i(j-N) \quad (2)$$

where N is the number of counts per cycle for 60 Hz.

In instances where the extracted information (i.e., fault current) lasts more than one cycle, then the following modification is used:

$$\delta(j) = i(j) - i(j - n*N) \quad (3)$$

where n is an integer.

Figure 2:
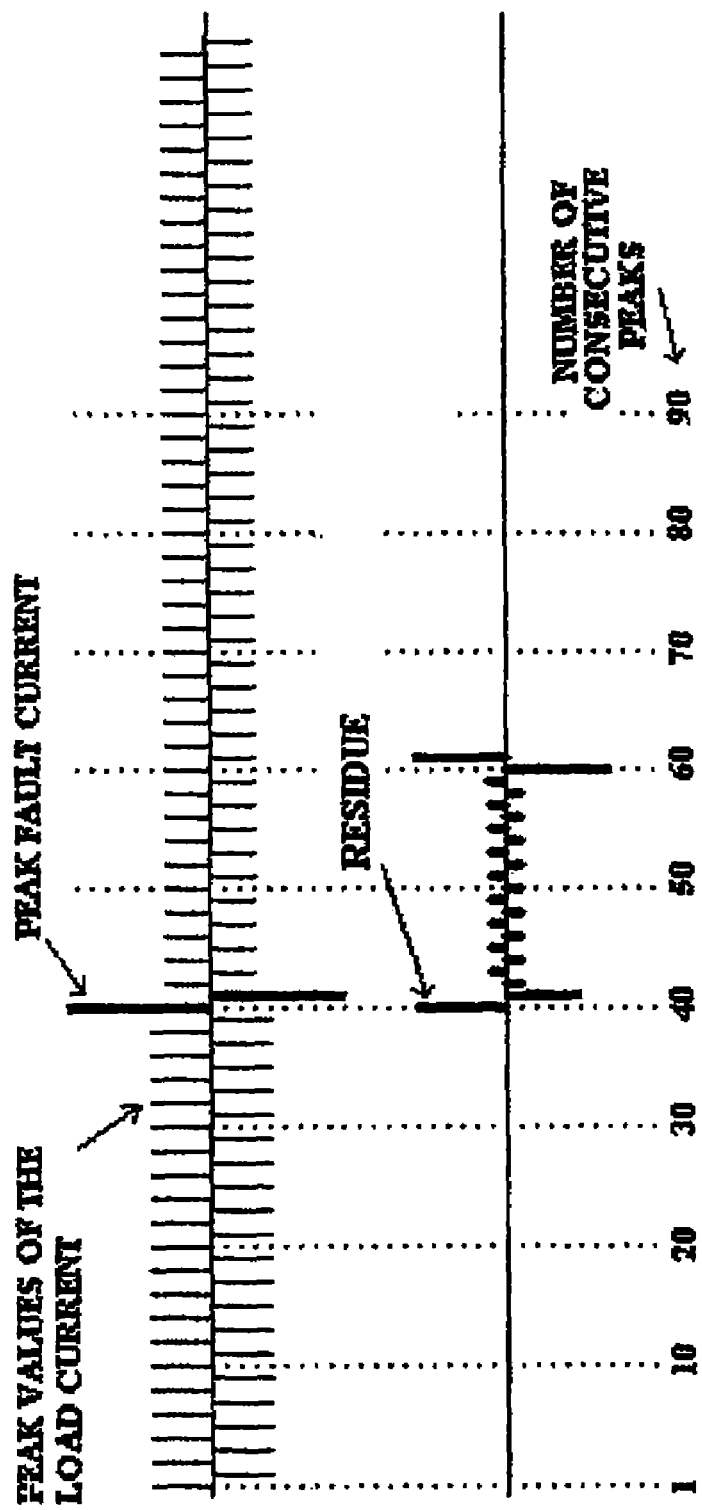
FIG. 2 is a chart illustrating the differences between peak values of a load current contrasted with peak values of a fault current, and the residue of the two.

As an example, referring to FIG. 2, only the peak values are saved in memory as shown in the upper portion of the Fig. A fault lasting for only one cycle of a 60 Hz waveform is shown darkened in the Fig. After the fuse disconnects the faulty section of the power distribution network, net feeder load is reduced. For n=10 in equation (3) above, the algorithm is encompassed in the waveform. For each cycle of the 60 Hz waveform, N=2, since there are two peaks per cycle. The resulting residue is shown in the lower portion of FIG. 2.

During steady state conditions, the residual is zero. This is true for j<40 in FIG. 2. When the first peak of a fault current is detected, the steady state portion of the current waveform is subtracted from it with the resulting residue or residual being close to the actual fault current peak (which peak is superimposed on the steady state load current on the feeder). For 42<j>60 in FIG. 2, the residual is equal to the post fault load current minus the pre-fault load current. For j=60 and j=61, the residual is equal to the difference between the post fault steady state current and the current during the fault. For j>=62, the residue again equals zero. The differential technique described by the algebraic expression in Equation (3) can be used to generate substantially all of the events which occur before the fuse's operation, which occur during fuse operation, and subsequent to operation of the fuse (i.e., post fault conditions). The magnitude of the fault current, and the magnitude of the load loss current are also obtained from the use of the equation to determine the residue.

It will be understood by those skilled in the art that the same algorithm can also be used to obtain the signature patterns of residues resulting from circuit breaker operation, load changes, etc. Accordingly, FIGS. 3-7 illustrate various signature patterns of residues due to circuit breaker operation, load changes, and fault current responses at sympathetic feeders and are generated using EMTP modeling methods.

In FIG. 3, the fault occurring is a φA to ground fault on the LV side of the service transformer represents a line-to-ground LV fault cleared by the service transformer's HV (high voltage) side fuse in two cycles. This is done for two different substation transformer loading conditions: a light load as shown in FIG. 3a, and a heavy load as shown in FIG. 3b. The transformer is assumed to be operating under a full load condition, with a power factor (P.F.) of 70%. In accordance with Equation (3), the plot resulting from the signal extraction algorithm shows the signal at the time of the fault (1.2 seconds). Since the extraction window was selected as 10 cycles, its "mirror" is shown 10 cycles later.

In FIG. 4, the fault is a φA to ground fault occurring under heavy load conditions (14.9 MW, 2.37 MVAR) on the MV side of a transformer at the end point of a lateral L. Now, the fault is cleared in two cycles by the lateral's fuse F1 or F2. Also, the lower plot in the Fig. represents the extracted current on feeder R as measured at a substation. It will be noted that the oscillating waveform is similar to that of a motor's starting current, and that this waveform is readily distinguishable from the proceeding fault current waveform.

Figure 6:
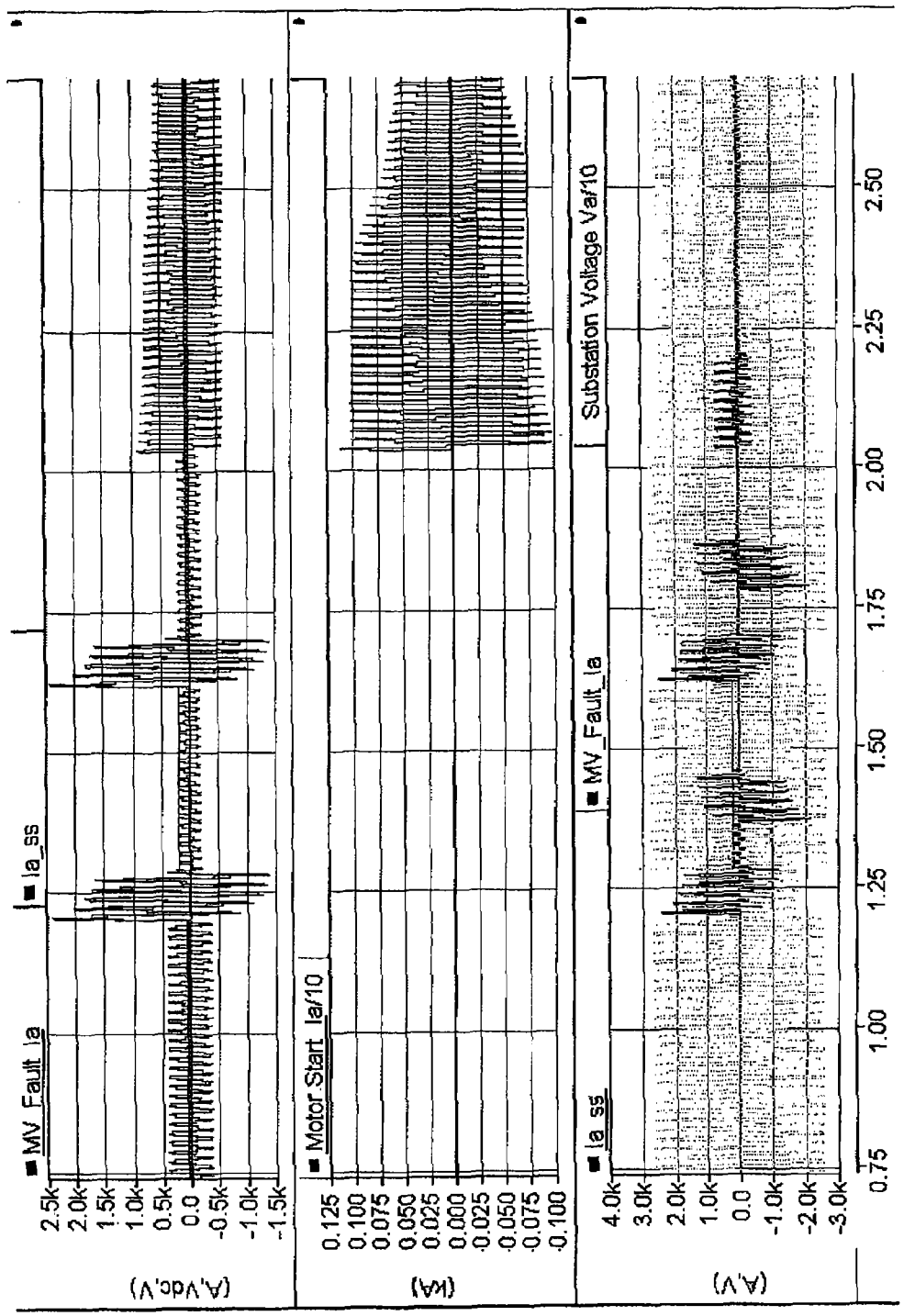
FIG. 6 is a display similar to FIG. 5, but for a 20 cycle reclosing time.

In FIG. 5, the fault is a short circuit occurring on feeder R past circuit breaker BR1 or a recloser downstream of the circuit breaker. The reclosing action occurs 15 cycles after a circuit breaker opens in response to the short circuit condition. FIG. 6 is similar to FIG. 5 in that it is for a similar fault condition. Now, however, the reclosing action occurs 20 cycles after the circuit breaker opens. Also, as represented by the plot in the middle of FIG. 6, the recloser opens for the third time after the fault has been cleared, and a 1-MW induction motor connected upstream of the recloser, through a 33/13./8 kV transformer, for example, comes on line at that time.

Finally, FIG. 7a presents the current at an adjacent feeder to feeder R. In this example, the current is less than 1% of the fault current on feeder R when the other feeder is operating at a low power factor (P.F.=0.65). If more capacitance is added on feeder to drive its power factor closer to 1.0; then, the current on the other feeder, as a percentage of the fault current in feeder R increases to around 3.3%. This is as shown in FIG. 7b.

In view of the above, it will be seen that the several objects and advantages of the present invention have been achieved and other advantageous results have been obtained.

What I claim as my invention is:

1. In a two-way automated communication system (TWACS) for a multiple phase electrical distribution system by which communications including poll requests are sent from a station of the system to transponders of electrical meters located at power using facilities and responses are sent back to the station by the transponders in response to the communications, some of the meters responding to communications sent on one of the phases with other of the meters responding to communications sent on other of the phases, a method of quickly and accurately mapping a location and extent of an outage occurring in the electrical distribution system without having to poll all of the electrical meters, comprising:
   using a programmable device incorporating a memory in which is stored addresses of the electrical meters in an area where the outage has occurred;
   detecting the occurrence of a fault causing the outage and the electrical phase on which the fault has occurred, occurrence of the fault being indicated by operation of a protective device including a circuit breaker for a feeder line of the electrical distribution system, or a fuse for a lateral line coming off of the feeder line, operation of the protective device producing a signature indicative of the type of protective device which operated;
   when the fault occurs, using the programmable device and the TWACS to selectively poll the meters associated with the electrical phase on which the fault has occurred in that portion of the electrical distribution system experiencing the outage, those meters outside the area where the outage has occurred responding to the poll, and those meters within the area of the outage not responding thereto; and,
   based upon solicited responses received from the poll, mapping the extent of the outage, whereby by only polling meters within the area where the fault has occurred and determining which, if any, meters responded to the poll, the extent of the outage is quickly and accurately mapped and efforts to restore service within are rapidly and efficiently carried out.

2. The method of claim 1 further including identifying the speed at which the circuit breaker or fuse operates so as to minimize loss of power within the system when the fault occurs.

3. The method of claim 2 in which at least one of the protective devices has a programmable time delay throughout which the fault must be present before the protective device responds to the fault and de-energizes the portion of electrical distribution system associated with the protective device.

4. The method of claim 3 in which at least one of the protective devices automatically responds to the occurrence of the fault to de-energize the portion of the system associated with the protective device.

5. The method of claim 1 including programming into the programmable device addresses of respective transponders corresponding to the meters installed throughout the system.

6. In a two-way automated communication system (TWACS) for a multiple phase electrical distribution system by which communications including poll requests are sent from a station of the system to transponders of electrical meters located at power using facilities and responses are sent back to the station by the transponders in response to the communications, with some of the meters responding to communications sent on one of the phases and with other of the meters responding to communications sent on other of the phases, a system for quickly and accurately mapping a location and extent of an outage occurring in the electrical distribution system without having to poll all of the electrical meters, comprising:
   means for detecting the occurrence of a fault causing the outage and the electrical phase on which the fault occurs, occurrence of the fault being indicated by operation of a protective device including a circuit breaker for a feeder line of the electrical distribution system, or a fuse for a lateral line coming off of the feeder line, operation of the protective device producing a signature indicative of the type of protective device which operated;
   a programmable device incorporating a memory in which is stored addresses of the electrical meters in an area where the outage has occurred, the device being responsive to the occurrence of the fault for selectively polling, using the TWACS, the meters associated with the electrical phase on which the fault has occurred, those meters outside the area where the outage has occurred responding to the poll, and those meters within the area of the outage not responding thereto; and,
   means responsive to solicited responses received from the poll for mapping the extent of the outage, only polling meters within the area where the fault has occurred and monitoring which, if any, meters responded to the poll, determining the location and extent of the outage whereby the area is quickly and accurately mapped for efforts to restore service to be rapidly and efficiently carried out.

7. The system of claim 6 in which the device is programmable with addresses of the respective transponders for the meters installed throughout the electrical distribution system.

8. The system of claim 7 in which electrical current from the electrical distribution system flows from a bus to a feeder line and from the feeder line to at least one lateral line, a circuit breaker being interposed in the feeder line between the juncture of the feeder line with each lateral line, and, when a fault occurs, the device polling a first meter on one side of the circuit breaker and a second meter on the other side thereof whereby if the transponder for the first meter responds to the poll but the transponder for the second meter does not, the circuit breaker has opened in response to the fault.

9. The system of claim 8 further including a fuse interposed in each lateral at the junction between the lateral and the feeder line at the upstream end of the lateral line, the device polling one meter serviced by each lateral line, whereby if a transponder for a meter in a lateral line responds to the poll that lateral line is energized, but if the transponder for the meter does not respond, that lateral line is de-energized.

10. The system of claim 9 in which current flowing through the lateral line is routed to a facility through a step-down transformer having an associated fuse and an associated transponder; and, the device polls each transformer connected to the lateral line, any transponder which does not respond to the poll indicating that the fuse for the transformer with which that transponder is associated is open.

11. In a communication system for a multiple phase electrical distribution system by which communications, including poll requests, are sent to transponders of electrical meters located at power using facilities and responses are sent back by the transponders in response to the communications, some of the meters responding to communications sent on one of the phases with other of the meters responding to communications sent on other of the phases, a method of quickly and accurately mapping a location and extent of an outage occurring in the electrical distribution system without having to poll all of the electrical meters, comprising:

using an intelligent fault detector to detect the occurrence of a fault causing the outage and the electrical phase on which the fault occurs, occurrence of the fault being indicated by operation of a circuit breaker for a feeder line of the electrical distribution system, or by operation of a fuse for a lateral line coming off of the feeder line, operation of the protective device producing a signature indicative of the type of protective device which operated;

when the fault occurs, selectively polling the meters associated with the electrical phase on which the fault has occurred in that portion of the electrical distribution system where the fault has occurred; those meters outside the area where the outage has occurred responding to the poll, and those meters within the area of the outage not responding thereto; and, based upon solicited responses received from the poll, mapping the extent of the outage, whereby by only polling meters in the area where the fault has occurred and determining which, if any, meters responded to the poll, the extent of the outage is quickly and accurately mapped and efforts to restore service within the area of the outage are rapidly and efficiently carried out.

12. In a communication system for a multiple phase electrical distribution system by which communications, including poll requests, are sent to transponders of electrical meters located at power using facilities and responses are sent back by the transponders in response to communications, with some of the meters responding to communications sent on one of the phases and with other of the meters responding to communications sent on other of the phases, a system for quickly and accurately mapping a location and extent of an outage occurring in the electrical distribution system without having to poll all of the electrical meters, comprising:

an intelligent fault detector detecting the occurrence of a fault causing the outage and the electrical phase on which the fault occurs, occurrence of the fault being indicated by operation of a circuit breaker for a feeder line of the electrical distribution system, or by operation of a fuse for a lateral line coming off of the feeder line, operation of the protective device producing a signature indicative of the type of protective device which operated;

a programmable device incorporating a memory in which is stored addresses of the electrical meters in the area where the outage has occurred and responsive to the occurrence of the fault for selectively polling the meters associated with the electrical phase on which the fault has occurred in that portion of the electrical distribution system where the fault has occurred; those meters outside the area where the outage has occurred responding to the poll, and those meters within the area of the outage not responding thereto; and, means responsive to solicited responses received from the poll for mapping the extent of the outage, only polling meters within an area where the fault has occurred and monitoring which, if any, meters responded to the poll, determining the location and extent of the outage whereby the area is quickly and accurately mapped for efforts to restore service to be rapidly and efficiently carried out.

\* \* \* \* \*